United States Patent
Hoque et al.

(10) Patent No.: US 11,739,018 B2
(45) Date of Patent: Aug. 29, 2023

(54) CONTINUOUS METHODS OF FORMING GLASS RIBBON USING A GYROTRON MICROWAVE HEATING DEVICE

(71) Applicant: Corning Incorporated, Corning, NY (US)

(72) Inventors: Aziz Hoque, Painted Post, NY (US); Chao Yu, Pittsford, NY (US)

(73) Assignee: CORNING INCORPORATED, Corning, NY (US)

( * ) Notice: Subject to any disclaimer, the term of this patent is extended or adjusted under 35 U.S.C. 154(b) by 351 days.

(21) Appl. No.: 17/018,231

(22) Filed: Sep. 11, 2020

(65) Prior Publication Data
US 2021/0078894 A1 Mar. 18, 2021

Related U.S. Application Data

(60) Provisional application No. 62/900,039, filed on Sep. 13, 2019.

(51) Int. Cl.
*C03B 17/06* (2006.01)
(52) U.S. Cl.
CPC .......... *C03B 17/067* (2013.01); *C03B 17/064* (2013.01)
(58) Field of Classification Search
None
See application file for complete search history.

(56) References Cited

U.S. PATENT DOCUMENTS

| 3,635,687 A | * | 1/1972 | Dunlap | C03B 17/06 65/106 |
| 4,248,925 A | * | 2/1981 | Ambrogi | A47J 36/04 65/47 |

(Continued)

FOREIGN PATENT DOCUMENTS

| CN | 101528617 A | 9/2009 | |
| DE | 102008063554 A1 | * 6/2010 | C03B 17/065 |

(Continued)

OTHER PUBLICATIONS

International Search Report and Written Opinion of the International Searching Authority; PCT/US2020/049884; dated Nov. 17, 2020; 8 Pages; European Patent Office.

(Continued)

*Primary Examiner* — Jodi C Franklin
(74) *Attorney, Agent, or Firm* — Travis B. Gasa; Amy T. Lang; John P. McGroarty

(57) ABSTRACT

A method of forming a glass ribbon includes flowing a molten glass into a caster having a width ($W_{cast}$) and a thickness ($T_{cast}$) to form a cast glass, cooling the cast glass in the caster to a viscosity of $10^8$ Poise or more, conveying the cast glass from the caster, volumetrically heating the cast glass to an average viscosity of $10^6$ Poise or less using a gyrotron microwave heating device, and drawing the cast glass into a glass ribbon having a width ($W_{gr}$) that is less than or equal to the width ($W_{cast}$) of the caster and a thickness ($T_{gr}$) that is less than the thickness ($T_{cast}$) of the caster.

15 Claims, 10 Drawing Sheets

(56) References Cited

U.S. PATENT DOCUMENTS

| | | | |
|---|---|---|---|
| 6,408,649 B1 | 6/2002 | Sklyarevich et al. | |
| 7,231,786 B2 * | 6/2007 | Cimo | C03B 23/037 65/94 |
| 8,966,940 B2 * | 3/2015 | Kumada | C03B 23/047 65/95 |
| 9,108,875 B2 | 8/2015 | Jiao et al. | |
| 9,670,089 B2 | 6/2017 | Yanase et al. | |
| 9,676,650 B2 * | 6/2017 | Kariya | C03B 17/064 |
| 9,896,367 B2 | 2/2018 | Bisson et al. | |
| 10,377,656 B2 * | 8/2019 | Dannoux | C03B 17/064 |
| 10,906,831 B2 * | 2/2021 | Dannoux | C03B 17/06 |
| 11,427,493 B2 * | 8/2022 | Christopher | C03B 17/067 |
| 11,465,926 B2 * | 10/2022 | Delia | C03B 17/064 |
| 11,512,015 B2 * | 11/2022 | Delia | C03B 25/12 |
| 2004/0197575 A1 * | 10/2004 | Bocko | C03B 17/062 428/432 |
| 2007/0015651 A1 * | 1/2007 | Endo | C03B 11/08 65/129 |
| 2009/0019892 A1 * | 1/2009 | Fredholm | C03B 40/04 65/183 |
| 2009/0217705 A1 * | 9/2009 | Filippov | C03B 17/067 65/99.1 |
| 2009/0314032 A1 * | 12/2009 | Tomamoto | C03B 17/067 65/273 |
| 2012/0114904 A1 | 5/2012 | Yanase et al. | |
| 2012/0304695 A1 * | 12/2012 | Lakota | C03B 17/064 65/97 |
| 2013/0015180 A1 * | 1/2013 | Godard | C03B 17/064 219/759 |
| 2013/0047671 A1 * | 2/2013 | Kohli | C03B 25/093 65/83 |
| 2014/0342120 A1 | 11/2014 | Buellesfeld et al. | |
| 2014/0352357 A1 * | 12/2014 | Jiao | C03B 29/08 65/158 |
| 2014/0357467 A1 | 12/2014 | Buellesfeld et al. | |
| 2015/0000345 A1 * | 1/2015 | Jiao | G01B 11/14 65/158 |
| 2015/0068251 A1 * | 3/2015 | Ottermann | C03B 23/037 65/106 |
| 2015/0099618 A1 * | 4/2015 | Bisson | C03B 17/061 65/25.2 |
| 2015/0218028 A1 * | 8/2015 | Tamamura | C03B 17/064 65/195 |
| 2015/0284282 A1 | 10/2015 | Godard et al. | |
| 2015/0344346 A1 * | 12/2015 | Jiao | C03B 25/08 65/29.11 |
| 2015/0344347 A1 * | 12/2015 | Fleming | B65H 23/0204 242/615.1 |
| 2015/0345996 A1 * | 12/2015 | Brackley | B65H 23/0204 324/207.15 |
| 2016/0115067 A1 * | 4/2016 | De Angelis | C03B 5/18 65/195 |
| 2017/0338428 A1 | 11/2017 | Loeffelbein et al. | |
| 2018/0079675 A1 * | 3/2018 | Afzal | C03B 25/08 |
| 2018/0265391 A1 | 9/2018 | Boratav et al. | |
| 2018/0327297 A1 * | 11/2018 | Stempin, Jr. | C03B 17/067 |
| 2020/0002211 A1 * | 1/2020 | Dannoux | C03B 19/02 |
| 2021/0078894 A1 * | 3/2021 | Hoque | C03B 17/064 |
| 2021/0078895 A1 * | 3/2021 | Fekety | C03B 17/064 |

FOREIGN PATENT DOCUMENTS

| | | | |
|---|---|---|---|
| DE | 102008063554 A1 | 6/2010 | |
| DE | 102014119064 A1 * | 6/2016 | C03B 17/065 |
| EP | 1710212 A1 | 10/2006 | |
| EP | 2039662 A1 * | 3/2009 | C03B 17/04 |
| EP | 2452926 A1 | 5/2012 | |
| EP | 3587364 A1 | 1/2020 | |
| JP | 62-283831 A | 12/1987 | |
| JP | 2006-256938 A | 9/2006 | |
| JP | 2008-133174 A | 6/2008 | |
| JP | 2009-509896 A | 3/2009 | |
| JP | 2009-519884 A | 5/2009 | |
| JP | 2009-242190 A | 10/2009 | |
| JP | 2012-051789 A | 3/2012 | |
| JP | 2013-100231 A | 5/2013 | |
| JP | 2013-227169 A | 11/2013 | |
| JP | 2016-069273 A | 5/2016 | |
| JP | 2017-124949 A | 7/2017 | |
| TW | 200829523 A | 7/2008 | |
| TW | 201109287 A | 3/2011 | |
| TW | 201504169 A | 2/2015 | |
| WO | 2011/004844 A1 | 1/2011 | |
| WO | 2014/009766 A2 | 1/2014 | |
| WO | 2014/157649 A1 | 10/2014 | |
| WO | 2017/104513 A1 | 6/2017 | |

OTHER PUBLICATIONS

International Search Report and Written Opinion of the International Searching Authority; PCT/US2020/050081 dated Nov. 19, 2020, 08 pages; European Patent Office.

Bocko et al. "Glass for the future: displays and semiconductors", 2013 Symposium on VLSI Circuits, IEEE, pp. C86-C89.

Campbell et al; "Continuous Melting of Phosphate Laser Glasses"; Journal of Non-Crystalline Solids, 263 & 264 (2000); 342-357.

* cited by examiner

CONTINUOUS METHODS OF FORMING GLASS RIBBON USING A GYROTRON MICROWAVE HEATING DEVICE

This application claims the benefit of priority to U.S. Provisional Application Ser. No. 62/900,039 filed on Sep. 13, 2019, the content of which is relied upon and incorporated herein by reference in its entirety.

BACKGROUND

Field

The present disclosure relates generally to methods of making glass ribbon and, more particularly, continuous methods of making glass ribbon with high dimensional stability from glass compositions with relatively low liquidus viscosities.

Technical Background

Conventional methods of making optical components from glass compositions having low liquidus viscosities, including compositions with high refractive indices, are very high in cost with low utilization of the molten glass borne from these methods. Typically, these methods include casting the compositions into long bars with a thickness that is significantly greater in thickness than the final end product. That is, these forming methods produce a cast bar that requires additional processing to obtain a final product form and dimensions.

The additional processing of these cast bars is often extensive. In particular, the cast bar is sawed into discs. Next, the discs are ground to polish their outer diameter to the final outer dimension of the end product. The discs are then wire sawed to a thickness on the order of the end product, and then subjected to a significant battery of grinding and polishing steps to achieve the required warp and dimensional uniformity of the end product. Consequently, the conventional processes for forming optical components from these glass compositions is high in cost and low in utilization of the molten glass. Accordingly, improved methods of making optical components from glass compositions having low liquidus viscosities is desired.

SUMMARY

According to a first embodiment, a method of forming a glass ribbon includes flowing a molten glass into a caster having a width ($W_{cast}$) and a thickness ($T_{cast}$) to form a cast glass, cooling the cast glass in the caster to a viscosity of $10^8$ Poise or more, conveying the cast glass from the caster, volumetrically heating the cast glass to an average viscosity of $10^6$ Poise or less using a gyrotron microwave heating device, and drawing the cast glass into a glass ribbon having a width ($W_{gr}$) that is less than or equal to the width ($W_{cast}$) of the caster and a thickness ($T_{gr}$) that is less than the thickness ($T_{cast}$) of the caster.

A second embodiment includes the method of the first embodiment, wherein, during volumetric heating, the temperature of the cast glass increases at a heating rate of 15° C./second or greater.

A third embodiment includes the method of the first embodiment or the second embodiment, wherein volumetrically heating the cast glass occurs for a heating period of 0.5 seconds to 10 seconds.

A fourth embodiment includes the method of any of the previous embodiments, wherein, during volumetric heating, the gyrotron microwave heating device generates a microwave beam having a power intensity of $1 \times 10^6$ W/m$^2$ or greater.

A fifth embodiment includes the method of any of the previous embodiments, wherein, during volumetric heating, the gyrotron microwave heating device generates a microwave beam having a frequency of 10 GHz to 300 GHz.

A sixth embodiment includes the method of any of the previous embodiments, wherein the cast glass has a first major surface, a second major surface opposite the first major surface, and a glass body extending from the first major surface to the second major surface and having a central region disposed equidistant from the first major surface and the second major surface and during volumetric heating of the cast glass, a temperature of the central region of the glass body of the cast glass is equal to or greater than a temperature of the first major surface of the cast glass and a temperature of the second major surface of the cast glass.

A seventh embodiment includes the method of the sixth embodiment, wherein, during volumetric heating, the central region of the cast glass reaches a temperature of 750° C. or greater.

An eighth embodiment includes the method of any of the previous embodiments, wherein during volumetric heating, the gyrotron microwave heating device generates a microwave beam and a cross section of the microwave beam has a width that is greater than the width ($W_{cast}$) of the caster.

A ninth embodiment includes the method of any of the previous embodiments, wherein the width ($W_{cast}$) of the caster is from 100 mm to 1 m and the thickness ($T_{cast}$) of the caster is from 10 mm to 50 mm.

A tenth embodiment includes the method of any of the previous embodiments, wherein, when conveyed from the caster, the cast glass has a thickness ($T_{cg}$) of 12 mm or greater.

An eleventh embodiment includes the method of any of the previous embodiments, wherein the cast glass is cooled in the caster to a temperature of 700° C. or less and no lower than 50° C.

A twelfth embodiment includes the method of any of the previous embodiments, wherein a maximum crystal growth rate of any crystalline phase of the cast glass is from 0.01 μm/min to 10 μm/min.

A thirteenth embodiment includes the method of any of the previous embodiments, wherein the molten glass flowing into the caster is a borosilicate glass, an aluminoborosilicate glass, an aluminosilicate glass, a fluorosilicate glass, a phosphosilicate glass, a fluorophosphate glass, a sulfophosphate glass, a germanate glass, a vanadate glass, a borate glass, or a phosphate glass.

A fourteenth embodiment includes the method of any of the previous embodiments, wherein the molten glass flowing into the caster has a viscosity of $5 \times 10^4$ Poise or less and a temperature of 1000° C. or greater.

A fifteenth embodiment includes the method of the fourteenth embodiment, wherein the molten glass flowing into the caster has a viscosity of 50 Poise or less.

The sixteenth embodiment includes the method of any of the previous embodiments, wherein the thickness ($T_{gr}$) of the glass ribbon is from 0.3 mm to 1 mm.

The seventeenth embodiment includes the method of any of the previous embodiments, wherein the glass ribbon has a refractive index of from 1.6 to 1.9.

The eighteenth embodiment includes the method of any of the previous embodiments, wherein the glass ribbon has a thickness variation from 0.01 µm to 50 µm and a warp from 0.01 µm to 100 µm.

According to a nineteenth embodiment, a glass forming system includes a melting apparatus, a caster, a plurality of edge rollers, and a gyrotron microwave heating device. The melting apparatus is disposed upstream the caster along a draw pathway and is configured to flow glass into the caster. The caster has a width ($W_{cast}$) and a thickness ($T_{cast}$) and is configured to cool glass. The gyrotron microwave heating device has a beam outlet disposed downstream the caster along the draw pathway on a first side of the draw pathway and the gyrotron microwave heating device is configured to volumetrically heat glass conveyed along the draw pathway. The plurality of edge rollers are disposed downstream the beam outlet of the gyrotron microwave heating device along the draw pathway and include a first edge roller disposed on a first side of the draw pathway and a second edge roller disposed on a second side of the draw pathway.

The twentieth embodiment includes the method of the nineteenth embodiment, further including a plurality of tractors disposed downstream the caster and upstream the beam outlet of the gyrotron microwave heating device along the draw pathway, wherein the plurality of tractors include a first tractor disposed on a first side of the draw pathway and a second tractor disposed on a second side of the draw pathway.

The twenty-first embodiment includes the method of the nineteenth embodiment or the twentieth embodiment, further including a microwave control structure having a microwave absorbing device surrounded by a microwave shielding device, wherein the beam outlet of the gyrotron microwave heating device extends into the microwave control structure.

The twenty-second embodiment includes the method of any of the nineteenth embodiment through the twenty-first embodiment, wherein the melting apparatus is an overflow melting apparatus.

The twenty-third embodiment includes the method of any of the nineteenth embodiment through the twenty-second embodiment, further including a plurality of secondary heating devices disposed upstream the beam outlet of the gyrotron microwave heating device along the draw pathway.

The twenty-third embodiment includes the method of the twenty-third embodiment, wherein the plurality of secondary heating devices include one or more convection heaters, one or more infrared heaters, or a combination thereof.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description describe various embodiments and are intended to provide an overview or framework to understanding the nature and character of the claimed subject matter.

The accompanying drawings are included to provide a further understanding of the various embodiments, and are incorporated into and constitute a part of this specification. The drawings illustrate the various embodiments described herein, and together with the description serve to explain the principles and operation of the claimed subject matter.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
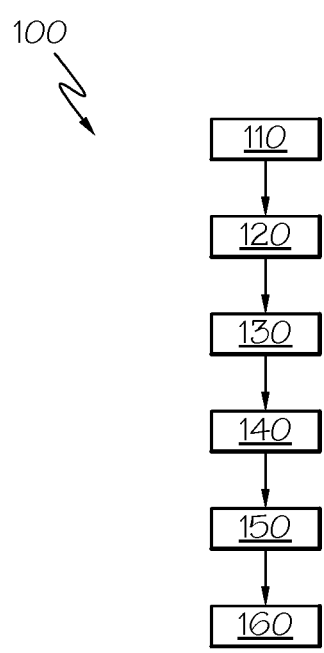
FIG. 1 is a flow chart depicting method of making a glass ribbon, according to one or more embodiments shown and described herein.

Reference will now be made in detail to embodiments of methods and systems for making glass ribbon and, more particularly, continuous methods of making glass ribbon for optical components from glass compositions with relatively low liquidus viscosities (e.g., $<5 \times 10^5$ Poise) and/or relatively high refractive indices. As one example, augmented reality systems demand increasingly smaller optical systems and displays that collectively form a high field of view. Glass substrates that are well suited for use as augmented reality displays are thin (e.g., from 0.3 mm to 1.0 mm), have a high refractive index (e.g., 1.60-1.80), have high transmission in the visible spectrum (e.g., 99% or more), and have a small total thickness variation (e.g., 1 µm or less). However, current glass compositions used to form augmented reality displays melt at very low viscosities, such as 10 Poise and are thus difficult to fusion form using current fusion forming techniques. Current methods of forming glass that melts at low viscosities, such as augmented reality display glass, includes casting glass melt into blocks which are sliced into thin sheets and then ground and polished to the required thickness. However, forming augmented reality display glass using this process is very costly, which limits its mass industrial adoption. Thus, improved methods of forming glass that has low liquidus viscosity are desired.

In the embodiments described herein, a continuous cast and draw method for forming glass ribbon is described. The glass ribbon formed using the embodiments described herein may be used to form low viscosity glass compositions, such as those useful as augmented reality displays. The continuous cast and draw method described herein includes flowing a molten glass into a caster to form a cast glass, cooling the cast glass in the caster, conveying the cast glass from the caster, and heating and drawing the cast glass into a thin glass ribbon. Further, during the continuous cast and draw method described herein, it is particularly advantageous that the re-heating step occur quickly and relatively uniformly through the thickness of the cast glass, as glass temperature uniformity through the thickness of glass when heating minimizes or eliminates devitrification and the formation of optical defects in the glass. However, standard heating methods, such as infrared heating, may be insufficient to achieve the desired rapid, uniform heating. Thus, the methods herein use a gyrotron microwave heating device to focus heating on a narrow region of the glass and volumetrically heat the cast glass at a fast rate after the cast glass exits the caster and prior to drawing it into a thin glass ribbon with minimal defect formation. The continuous cast and draw method described herein will enable mass production of the display glass for augmented reality application at a lower cost. The glass ribbon has high dimensional stability and low warpage and is produced at final dimensions comparable to those of the intended end products, such as display glass for augmented reality application. Accordingly, the glass ribbon requires limited post-processing, which lowers manufacturing cost and reduces waste. Various embodiments of processes and systems for forming glass ribbons will be described herein with specific references to the appended drawings.

As used herein, the terms "upper liquidus viscosity" and "upper liquidus temperature" refer to the respective viscosity and temperature of the glass employed in the articles and methods of the disclosure at which the glass forms a homogenous melt with no crystals. Further, the terms "upper liquidus viscosity" and "liquidus viscosity" are used interchangeably herein; and the terms "upper liquidus temperature" and "liquidus temperature" are also used interchangeably herein.

As also used herein, the "lower liquidus viscosity" and "lower liquidus temperature" refer to the respective viscosity and temperature of the glass employed in the articles and methods of the disclosure at which the glass can be susceptible to the growth of one or more crystalline phases.

As used herein the "devitrification zone" of the glass employed in the articles and methods of the disclosure is the temperature range given by the upper liquidus temperature to the lower liquidus temperature, e.g., the temperature range in which the glass experiences crystal growth of one or more crystalline phases above 0.01 μm/min.

As used herein, the "average viscosity" of the glass employed in the articles and methods of the disclosure refers to the viscosity of the glass, glass ribbon, glass sheet or other article of the disclosure, as measured during the referenced process or method step (e.g., drawing) over a region of the article and over a time duration sufficient to ascertain an average viscosity value according to analytical and measurement methods understood by those of ordinary skill in the field of the disclosure. Viscosity and average viscosity, as used herein, are determined by first using an ASTM standard (C-695) lab measurement using a rotating crucible containing molten glass and a spindle with a thermocouple immersed in the glass. The ASTM standard (C-695) lab measurement measures the glass viscosity at different glass temperatures. Then, during the casting step (i.e., the step of cooling the molten glass as it flows through a caster) of the method described herein, glass temperature is measured using thermocouples located in both the glass and in the caster (e.g., 50 total thermocouples). The measured temperatures may then be used to determine the corresponding viscosity, such as average viscosity, using the lab measurement data from the ASTM standard (C-695) lab measurement. Moreover, as thermocouples are located both in the caster and in the glass, these thermocouples may be used to measure the temperature of the glass at the major surfaces of the glass and through the thickness of the glass, for example, the temperature of a central region of the glass.

As used herein, the term "continuous" refers to the methods and processes of the disclosure that are configured to form glass sheet, ribbon and other articles without the need for any intermediate and/or post-cooling thermal processing, such as annealing or re-drawing. Put another way, the processes and methods of the disclosure are configured to form glass sheets, glass ribbons and other articles that are not cut or sectioned prior to its drawing step.

As used herein, the "maximum crystal growth rate" refers to the maximum growth rate of any crystalline phases of the glass employed in the articles and methods of the disclosure at a referenced temperature or within a referenced temperature range, e.g., in units of μm/min. Without intending to be limited by theory, crystals growing at rates faster than the maximum crystal growth rate may make the glass undesirable for use in a display application. As also used herein, the "crystal growth rate" refers to the growth rate of any crystalline phases of the glass employed in the articles and methods of the disclosure at a referenced temperature or within a referenced temperature range, e.g., in units of μm/min. Without intending to be limited by theory, crystals can form when molten glass is cooled from its liquidus temperature (which vary with glass composition). It is typically undesirable to have crystals in glass. To minimize crystal formation, molten glass may be cooled at a fast rate such that glass molecules do not have sufficient time to nucleate and grow crystals. Furthermore, the crystal growth rates described herein are determined by using X-ray diffraction, which may be performed in a lab setting. In particular, molten glass may be cooled at controlled rates in a lab and the crystal growth rates may be determined under these controlled conditions using X-Ray diffraction.

As used herein, the "thickness variation" of the glass wafer, glass ribbon, glass sheet or other article of the disclosure is measured by determining the difference between the minimum and maximum thickness of the glass wafer, glass ribbon, glass sheet, or other article by a mechanical contact caliper or micrometer, or a non-contact laser gauge for articles having a thickness of 1 mm or greater.

As used herein, the "warp" of the glass wafer, glass ribbon, glass sheet or other article of the disclosure is measured according to the distance in between two planes containing the article, minus the average thickness of the article. Unless otherwise specified, warp as discussed herein is measured using a 3D measurement system, such as the Tropel® FlatMaster® MSP-300 Wafer Analysis System available from the Corning Tropel Corporation. For glass ribbons, glass sheets and other glass articles of the disclosure with a substantially rectangular shape, the warp is measured according to principles understood by those of ordinary skill in the field of the disclosure. In particular, the warp is evaluated from a square measurement area with a length defined by the quality area between the beads of the article minus five (5) mm from the inner edge of each of the beads. Similarly, for glass wafers of the disclosure with a substantially circular disk-like shape, the warp is also measured according to principles understood by those of ordinary skill in the field of the disclosure. In particular, the warp is evaluated from a circular measurement area with a radius defined by the outer radius of the wafer minus five (5) mm.

As used herein, the "critical cooling rate" of the glass, glass ribbon, glass sheet or other article of the disclosure is determined by melting multiple samples of the glass, glass sheet or other article down to its glass transition temperature at various, selected cooling rates. The samples are then cross-sectioned according to standard sectioning and polishing techniques and evaluated with optical microscopy at 100× to ascertain the presence of crystals in the bulk and at its free surfaces (i.e., the top, exposed surface and the bottom surface with an interface with a crucible or the like). The critical cooling rate corresponds to the samples with the lowest cooling rate not exhibiting crystals at its surfaces and bulk.

As used herein, "upstream" and "downstream" refer to the relative position of two locations or components along a draw pathway with respect to a melting apparatus. For example, a first component is upstream from a second component if the first component is closer to the laser optics along the path traversed by the laser beam than the second component.

Referring now to FIGS. 1-4, a method 100 (FIG. 1) and a glass forming system 10 (FIGS. 2 and 3) for forming a glass ribbon 30c are schematically depicted. The method 100 of forming the glass ribbon 30c first comprises a step 110 of flowing a molten glass 30a from a melting apparatus 15 into a caster 20 having a width ($W_{cast}$) 22 and a thickness ($T_{cast}$) 24 to form a cast glass 30b. Next, at step 120, the cast glass 30b is cooled in the caster 20, increasing the viscosity of the cast glass 30b. At step 130, the cast glass 30b is conveyed from the caster 20, using one or more tractors 62 and at step 140, the cast glass 30b is volumetrically heated using a gyrotron microwave heating device 50. Further, at step 150, the re-heated cast glass 30b is drawn into a glass ribbon 30c having a width ($W_{gr}$) 32 that is less than the width ($W_{cast}$) 22 of the cast glass 30b, and a thickness 34 ($T_{gr}$) and at step 160, the glass ribbon 30c is cooled to ambient temperature. As used herein, the width ($W_{gr}$) 32 and the thickness ($T_{gr}$) 34 of the glass ribbon 30c are measured after cooling. Thus, the glass ribbon 30c has a width ($W_{gr}$) 32 that is less than the width ($W_{cast}$) 22 of the cast glass 30b, after the glass ribbon 30c is cooled.

Glass 30 (i.e., the molten glass 30a, the cast glass 30b and the glass ribbon 30c) may comprise a borosilicate glass, an aluminoborosilicate glass, an aluminosilicate glass, a fluorosilicate glass, a phosphosilicate glass, a fluorophosphate glass, a sulfophosphate glass, a germanate glass, a vanadate glass, a borate glass, a phosphate glass, or the like. Further, the glass 30 comprises optical properties (e.g., transmissivity, refractive index, coefficient of thermal expansion, etc.) suitable for optical components, such as display glass of augmented reality applications. As one example, the composition of the glass 30 may comprise 40.2 mol % $SiO_2$, 2.4 mol % $B_2O_3$; 11.3 mol % $Li_2O$; 22.9 mol % CaO; 5.4 mol % $La_2O_3$; 3.8 mol % $ZrO_2$, 4.8 mol % $Nb_2O_5$, and 9.3 mol % $TiO_2$. (This example composition is referred herein as "Glass A"). As another example, the composition of the glass 30 may comprise 42.7 mol % $SiO_2$; 3.9 mol % $B_2O_3$; 4.7 mol % BaO; 26.6 mol % CaO; 4.5 mol % $La_2O_3$; 2.2 mol % $ZrO_2$; 6.1 mol % $Nb_2O_5$; and 9.3 mol % $TiO_2$. (This example composition is referred herein as "Glass B").

Further, the glass 30 is derived from a glass composition having a refractive index from 1.5 to 2.1, such as from 1.6 to 2.0, from 1.6 to 1.9, from 1.65 to 1.9, from 1.7 to 1.85, or from 1.6 to 1.8, for example, 1.5, 1.6, 1.65, 1.7, 1.75, 1.8, 2, 2.1, or any range having any two of these values as endpoints, or any open-ended range having any of these values as a lower or upper bound. The glass 30 may comprise an upper liquidus viscosity from 5 Poise to 50000 Poise, such as, $5\times10^5$ Poise or less, $1\times10^5$ Poise or less, $5\times10^4$ Poise or less, $1\times10^4$ Poise or less, $5\times10^3$ Poise or less, $1\times10^3$ Poise or less, $5\times10^2$ Poise or less, 100 Poise or less, 50 Poise or less, 40 Poise or less, 30 Poise or less, 20 Poise or less, 10 Poise or less, or any range having any two of these values as endpoints.

Figure 2:
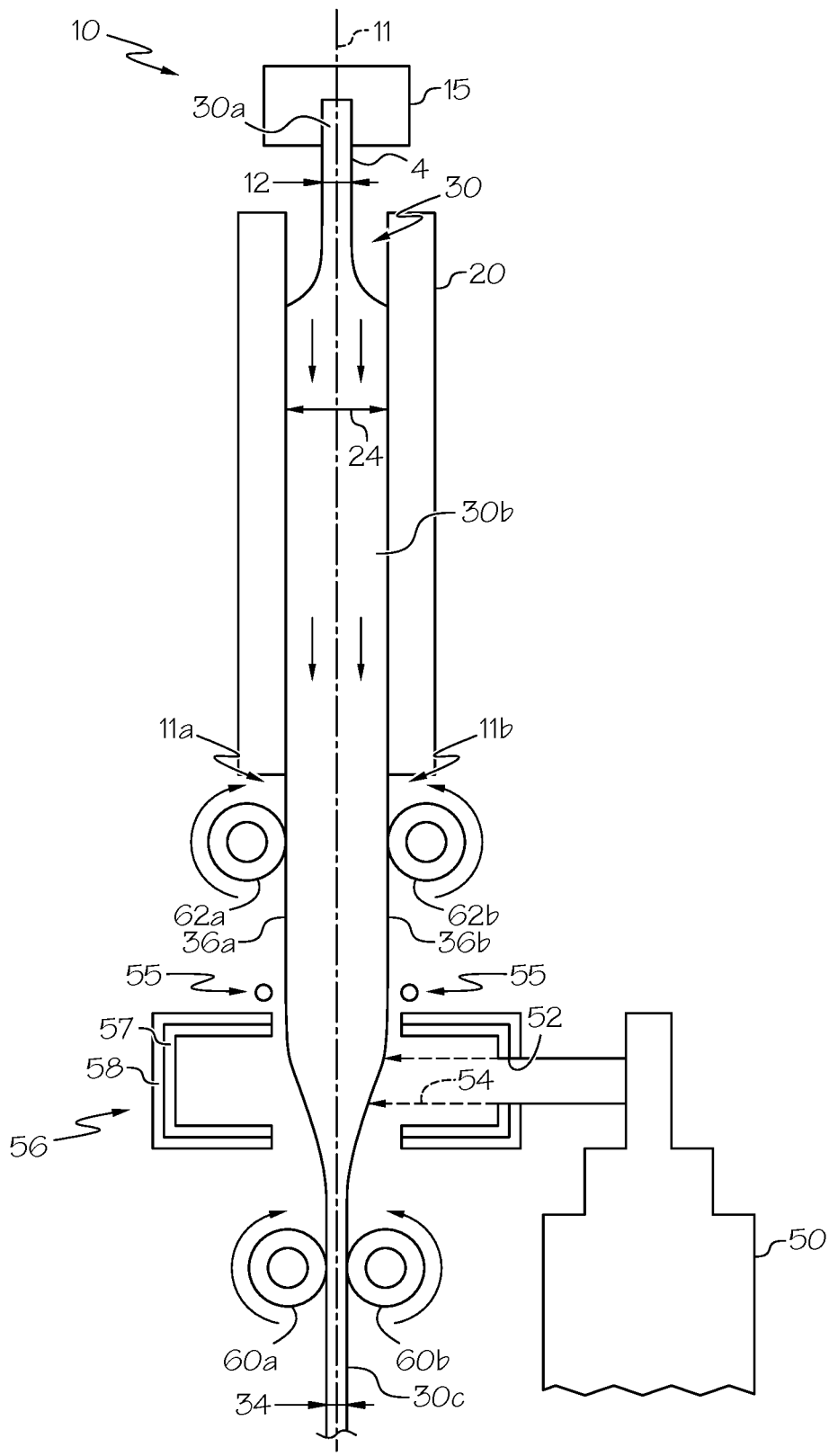
FIG. 2 is a schematic side view of an embodiment of a glass forming system having a melting apparatus, a caster, and a gyrotron microwave heating device, according to one or more embodiments shown and described herein.
Figure 3:
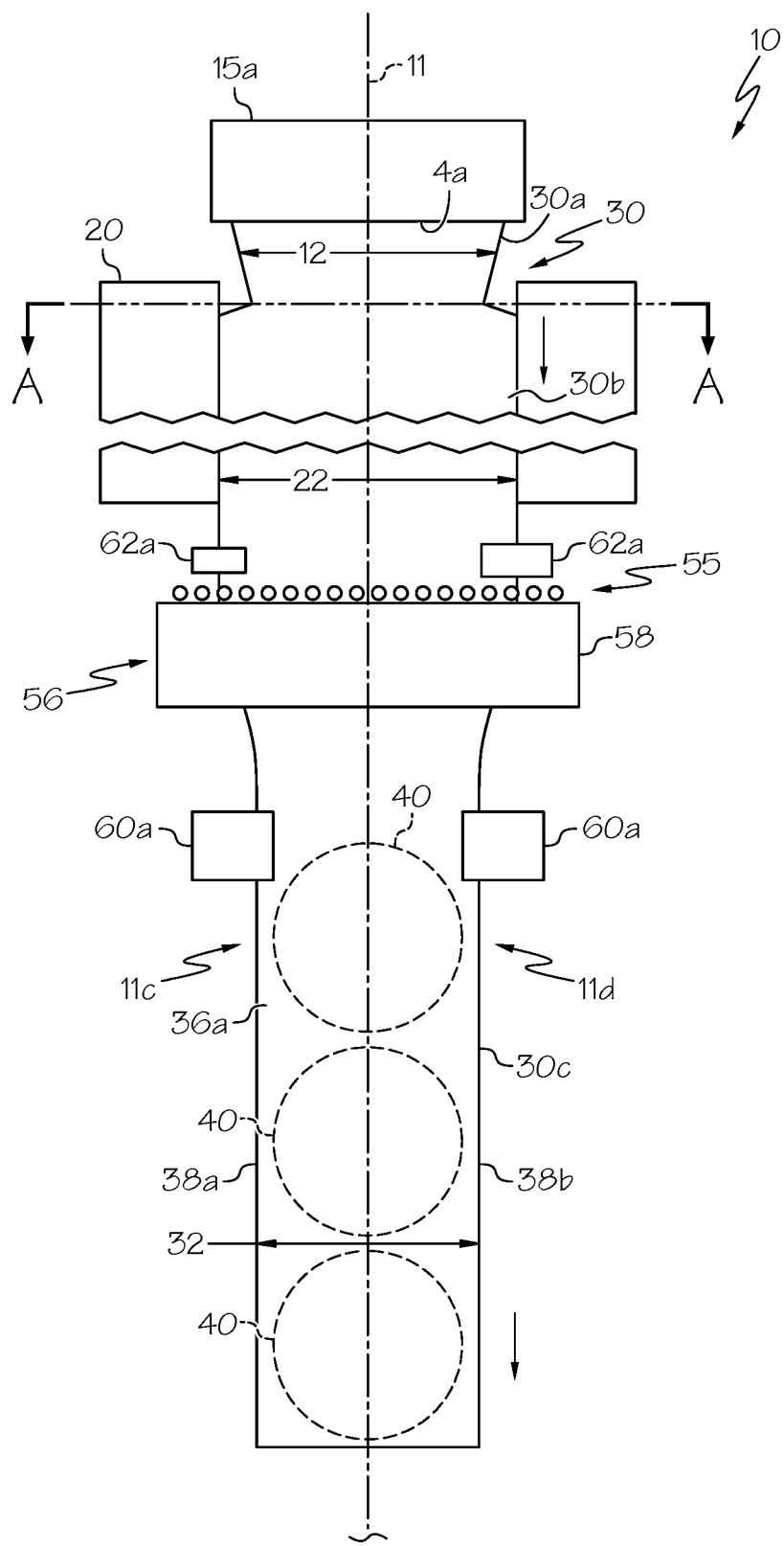
FIG. 3 is a schematic front view of the glass forming system of FIG. 2, according to one or more embodiments shown and described herein.
Figure 4:
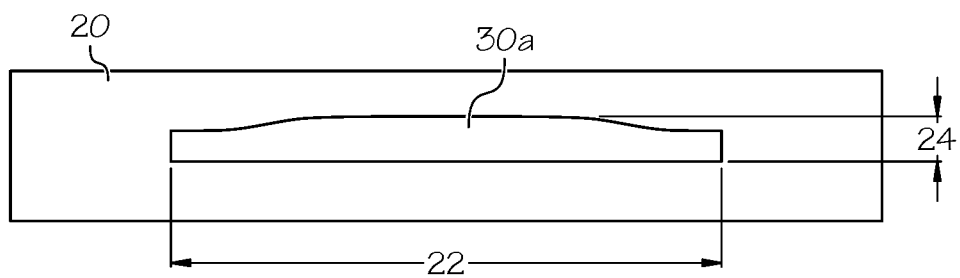
FIG. 4 is a cross-sectional view of the glass forming system of FIG. 3 taken along line A-A of FIG. 3, according to one or more embodiments shown and described herein.

Referring now to FIGS. 2-4, the glass forming system 10 comprises the melting apparatus 15, the caster 20 (a cross section of which is depicted in FIG. 4), the plurality of tractors 62, the gyrotron microwave heating device 50 comprising a beam outlet 52, and the plurality of edge rollers 60. The glass forming system 10 further includes a draw pathway 11, which is the pathway along which the glass 30 travels from the melting apparatus 15 through the glass forming system 10. The draw pathway 11 includes a first side 11a opposite a second side 11b (each shown in FIG. 2) and a first edge 11c opposite a second edge 11d (each shown in FIG. 3). When the glass 30 is traveling along the draw pathway 11, the first side 11a of the draw pathway 11 faces a first major surface 36a of the glass 30, the second side 11b of the draw pathway 11 faces a second major surface 36b of the glass 30, the first edge 11c of the draw pathway 11 faces a first edge surface 38a of the glass 30, and the second edge 11d of the draw pathway 11 faces a second edge surface 38b of the glass 30.

As shown in FIGS. 2 and 3, the caster 20 is disposed downstream the melting apparatus 15 and in operation, molten glass 30a may flow from the melting apparatus 15 along the draw pathway 11 into the caster 20. The caster 20 can be of varied construction, e.g., of various materials with or without additional cooling capabilities, as understood by those of ordinary skill in the field of the disclosure, provided that the caster 20 is capable of cooling the molten glass 30a (which becomes the cast glass 30b) through its devitrification zone to cool the cast glass 30b to a temperature of no lower than 50° C., e.g., as it is being conveyed in the direction of the arrows shown in FIG. 2 by the plurality of tractors 62. In some embodiments, the width ($W_{cast}$) 22 of the caster 20 is from 100 mm to 5 m, for example, from 200 mm to 5 m, from 250 mm to 5 m, from 300 mm to 5 m, from 350 mm to 5 m, from 400 mm to 5 m, from 450 mm to 5 m, from 500 mm to 5 m, from 100 mm to 4 m, from 100 mm to 3 m, from 100 mm to 2 m, from 100 mm to 1 m, from 100 mm to 0.9 m, from 100 mm to 0.8 m, from 100 mm to 0.7 m, from 100 mm to 0.6 m, from 100 mm to 0.5 m, such as 100 mm, 250 mm, 500 mm, 750 mm, 1 m, 2 m, 5 m, or any range having any two of these values as endpoints, or any open-ended range having any of these values as a lower or upper bound. In some embodiments, the thickness ($T_{cast}$) 24 of the caster 20 is from 1 mm to 500 mm, such as 2 mm to 250 mm, 5 mm to 100 mm, 10 mm to 50 mm, or the like, for example 1 mm or greater, 2 mm or greater, 3 mm or greater, 4 mm or greater, 5 mm or greater, 7 mm or greater, 8 mm or greater, 9 mm or greater, 10 mm or greater, 15 mm or greater, 20 mm or greater, 25 mm or greater, 30 mm or greater, 35 mm or greater, 40 mm or greater, 45 mm or greater, 50 mm or greater, any thickness up to 500 mm, or any range having any two of these values as endpoints. The caster 20 is a schematically depicted in FIGS. 2 and 3 to show the cast glass 30b positioned in the caster 20, however, it should be understood that, while the caster 20 has open ends, such that the cast glass 30b can travel through the caster 20, the sides of the caster 20 form a continuous structure, as shown in FIG. 4.

Referring again to FIGS. 2 and 3, the beam outlet 52 of the gyrotron microwave heating device 50 is disposed downstream the caster 20 along the draw pathway 11 and is configured to volumetrically heat glass conveyed along the draw pathway 11. As used herein, "volumetric heating" refers to heating the entire volume of a material (such as the glass 30) by using microwaves to penetrate uniformly throughout the volume of the material, thus delivering energy evenly into the body of the material. In contrast, infrared radiation uses thermal conduction, a surface heating phenomenon, such that the surface temperature of a material (such as the glass 30) rises much faster than the interior of the material. Accordingly, infrared heating requires a longer processing time to reach thermal uniformity in the material than volumetric heating.

Figure 5:
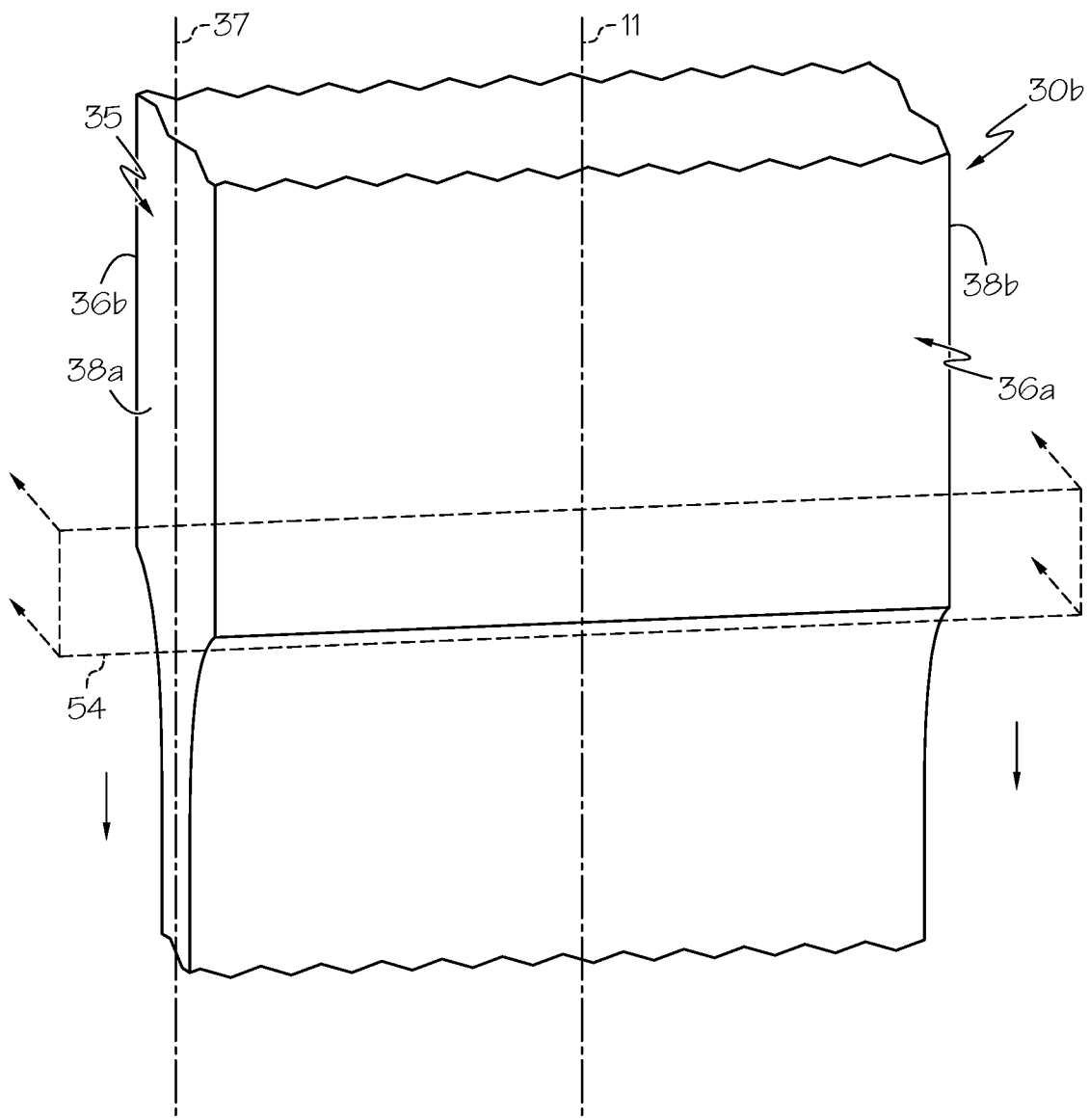
FIG. 5 is a partial perspective view of cast glass undergoing a heating process, according to one or more embodiments shown and described herein.

The gyrotron microwave heating device 50 may comprise a high power linear-beam vacuum tube, which generates millimeter-wave electromagnetic waves by the cyclotron resonance of electrons in a strong magnetic field. The gyrotron microwave heating device 50 includes the beam outlet 52. In operation, the gyrotron microwave heating device 50 generates a microwave beam 54 and directs the microwave beam 54 outward from the beam outlet 52 toward a major surface of the cast glass 30b, such as the first major surface 36a or the second major surface 36b. The beam outlet 52 is disposed on the second side 11b of the draw pathway 11 in the embodiment depicted in FIG. 2, such that the beam outlet 52 directs the microwave beam 54 toward the second major surface 36b, but it should be understood that the beam outlet 52 may be disposed on first side 11a. As also shown in FIG. 5, the microwave beam 54 can be focused by the gyrotron microwave heating device 50 into a stripe shape. For example, a cross section of the microwave beam 54 comprises a width that is equal to or greater than the width ($W_{cast}$) of the caster 20 and a length to facilitate short heating times and fast heating rates.

In operation, the microwave beam 54 generated by the gyrotron microwave heating device 50 may comprise a power intensity of $1 \times 10^6$ W/m² or greater, for example, $2 \times 10^6$ W/m² or greater, $3 \times 10^6$ W/m² or greater, $4 \times 10^6$ W/m² or greater, $5 \times 10^6$ W/m² or greater, $6 \times 10^6$ W/m² or greater, $7 \times 10^6$ W/m² or greater $8 \times 10^6$ W/m² or greater, $9 \times 10^6$ W/m² or greater, or any range having any two of these values as endpoints. In addition, the microwave beam 54 generated by the gyrotron microwave heating device 50 may comprise a frequency of 5 GHz to 500 GHz, such as 5 GHz to 400 GHz, 5 GHz to 300 GHz, 10 GHz to 300 GHz, 10 GHz to 200 GHz, 25 GHz to 200 GHz, 50 GHz to 200 GHz, for example, 5 GHz, 25 GHz, 50 GHz, 75 GHz, 100 GHz, 150 GHz, 200 GHz, 300 GHz, 400 GHz, 500 GHz, or any range having any two of these values as endpoints, or any open-ended range having any of these values as a lower or upper bound.

While a single gyrotron microwave heating device 50 is depicted in FIG. 2, embodiments comprising multiple gyrotron microwave heating devices 50 are contemplated. For example, the glass forming system 10 may comprise a first gyrotron microwave heating device having a beam outlet disposed on the first side 11a of the draw pathway 11 and a second gyrotron microwave heating device having a beam outlet disposed on the second side 11b of the draw pathway 11. In this embodiment, microwave beams 54 may be directed toward both the first major surface 36a and the second major surface 36b of the cast glass 30b.

Referring again to FIGS. 2 and 3, the glass forming system 10 may further include a microwave control structure 56. The microwave control structure 56 may comprise a microwave absorbing device 57, a microwave shielding device 58, or both. For example, in the embodiment depicted in FIGS. 2 and 3, the microwave control structure 56 comprises a microwave absorbing device 57 surrounded by a microwave shielding device 58. The microwave shielding device 58 may comprise a metal material, such as stainless steel, to reduce and/or prevent any microwave leakage. The microwave absorbing device 57 may comprise carbon-based foam microwave absorbers, a water jacket, or combinations thereof, to absorb microwaves, thereby reducing and/or preventing any microwave leakage. In addition, the beam outlet 52 of the gyrotron microwave heating device 50 may extend into the microwave control structure 56 such that the microwave beam 54 is contained within the microwave control structure 56, which helps direct the microwave beam 54 toward the draw pathway 11 and minimizes microwave propagation away from the draw pathway 11 and out of the microwave control structure 56. For example, the microwave control structure 56 may comprise a hole into which (or through which) the beam outlet 52 extends or is otherwise coupled. The microwave control structure 56 is a schematically depicted in FIGS. 2 and 3 to show the cast glass 30b positioned in the microwave control structure 56, however, it should be understood that, while microwave control structure 56 has open ends, such that the cast glass 30b can flow through the microwave control structure 56, the sides of microwave control structure 56 may form a continuous structure.

As depicted in FIGS. 2 and 3, some embodiments of the glass forming system 10 comprise a plurality of secondary heating devices 55, which may assist in the heating step 140. As depicted in FIGS. 2 and 3, the plurality of secondary heating devices 55 may be disposed upstream the beam outlet 52 of the gyrotron microwave heating device 50 along the draw pathway 11, for example, along the first side 11a and the second side 11b of the draw pathway 11. The plurality of secondary heating devices 55 may comprise one or more convection heaters, one or more infrared heaters, one or more resistance heaters, one or more induction heaters, or the like.

Further, the plurality of edge rollers 60 are disposed downstream the beam outlet 52 of the gyrotron microwave heating device 50 and include at least one first edge roller 60a disposed at the first side 11a of the draw pathway 11 and at least one second edge roller 60b disposed at the second side 11b of the draw pathway 11. In operation, the at least one first edge roller 60a may engage the first major surface 36a of the cast glass 30b, the at least one second edge roller 60b may engage the second major surface 36b of the cast glass 30b, and the at least one first edge roller 60a and the at least one second edge roller 60b rotate to apply a pulling force to the cast glass 30b, thereby drawing the cast glass 30b into the glass ribbon 30c. The plurality of tractors 62 are disposed between the caster 20 and beam outlet 52 of the gyrotron microwave heating device 50, downstream the caster 20 and upstream both the beam outlet 52 of the gyrotron microwave heating device 50 and the plurality of edge rollers 60. The plurality of tractors 62 include rollers for controlling the velocity of the cast glass 30b as it travels through and exits the caster 20. The plurality of tractors 62 include one or more first tractors 62a disposed on the first side 11a of the draw pathway 11 and one or more second tractors 62b disposed on the second side 11b of the draw pathway 11.

Referring now to FIG. 3, in some embodiments, the melting apparatus 15 comprises a melter such that the exit element 4 is an orifice 4a that distributes the molten glass 30a as it leaves the melting apparatus 15. The orifice 4a comprises a maximum dimension 12, which may be 5 m or less. The maximum dimension 12 of the orifice 4a can be less than or equal to the width ($W_{cast}$) 22 of the caster 20. Depending on the viscosity of the molten glass 30a flowing from the melting apparatus 15, the width ($W_{cast}$) 22 of the caster 20 can have a width that is the same as, or smaller than, the maximum dimension 12 of the orifice 4a. As such, the maximum dimension 12 of the orifice 4a can be less than or equal to the width ($W_{cast}$) 22 of the caster 20. In other embodiments, the maximum dimension 12 of the orifice 4a can be larger than the width ($W_{cast}$) 22 of the caster 20, e.g., for compositions of the molten glass 30a that are relatively low in upper liquidus viscosity (e.g., 5 Poise to 50000 Poise). In particular, these glasses upon melting (i.e., the molten glass 30a) can 'neck' as they leave the orifice 4a of the melting apparatus 15, allowing them to flow into a caster 20 having a width ($W_{cast}$) 22 that is smaller in dimension than the maximum dimension 12 of the orifice 4a of the melting apparatus 15. In other embodiments, the width ($W_{cast}$) of the caster 20 may be greater than or equal to the maximum dimension 12 of the exit element 4.

Figure 6A:
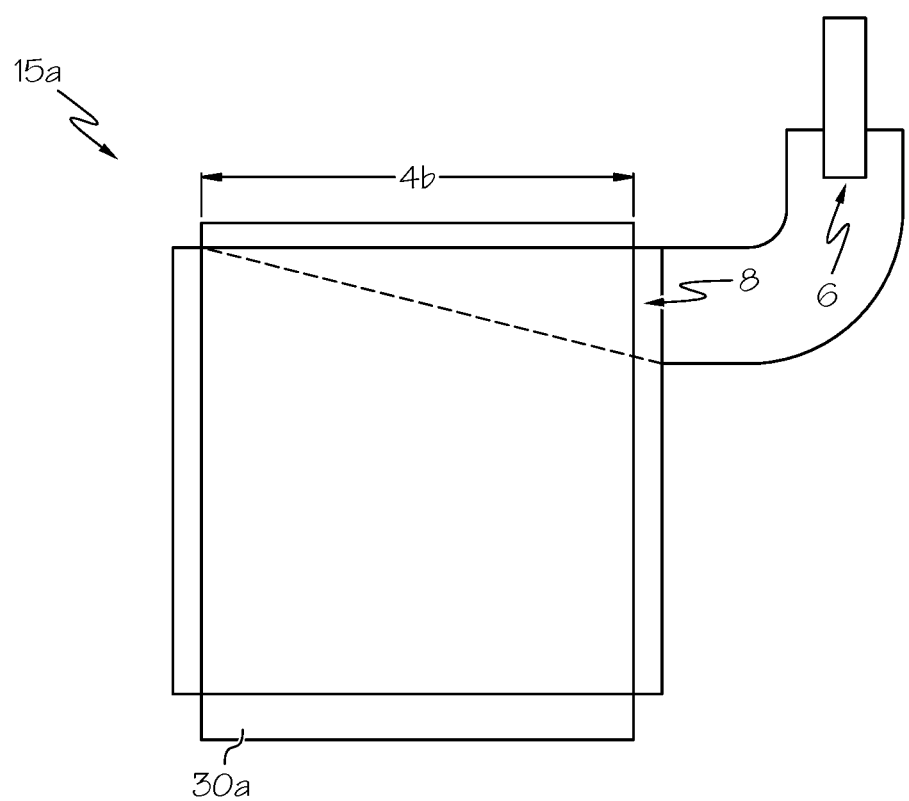
FIG. 6A is a schematic front view of an overflow melting apparatus with an isopipe for flowing glass, according to one or more embodiments shown and described herein.
Figure 6B:
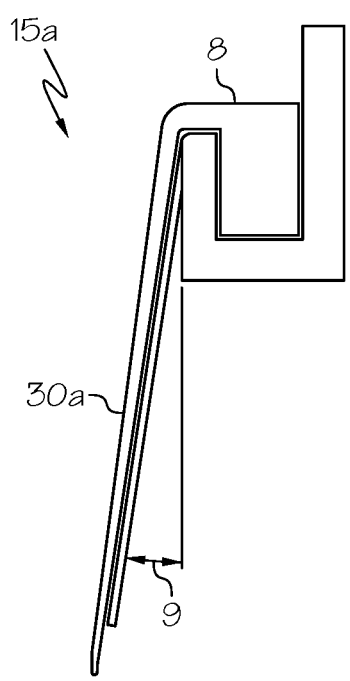
FIG. 6B is a schematic side view of the overflow melting apparatus of FIG. 6A, according to one or more embodiments shown and described herein.

In other embodiments, as depicted in FIGS. 6A and 6B, the melting apparatus 15 comprises an overflow melting apparatus 15a in which the exit element 4 serves to distribute the molten glass 30a. The overflow melting apparatus 15a comprises a vessel 6 and an isopipe 8, which may include a weir. In operation, glass can be melted into molten glass 30a and flowed from a vessel 6 into the isopipe 8. As the molten glass 30a overflows from a weir or similar aspect of the isopipe 8, it flows over the isopipe 8 and down into the caster 20 (FIG. 2-4). The vessel 6 includes any of a variety of heating elements understood by those with ordinary skill in the field of the disclosure for melting of glass. In some embodiments, the overflow melting apparatus 15a can include a weir within the isopipe 8, which allows the molten glass 30a to overflow and spread along one or more outer surfaces of the isopipe 8. In such embodiments, the molten glass 30a can spread on one or both sides of the isopipe 8 to a width 4b. The width 4b may be 5 m or less and may be less than or equal to the width 22 ($W_{cast}$) of the caster 20. As shown in FIGS. 6A and 6B, the isopipe 8 has a one side, angled from vertical by an angle 9. The angle 9 is between 0° and 30°, for example, 0° to 20°.

Referring now to FIGS. 1-6B, the method 100 will now be described in more detail. At step 110, the melting apparatus 15 may deliver the molten glass 30a via the exit element 4 having the maximum dimension 12, which is the approximate width of the molten glass 30a as it leaves the melting apparatus 15 and flows into the caster 20. In some embodiments, the width ($W_{cast}$) 22 of the caster 20 may be less than or equal to the maximum dimension 12 of the exit element 4, for example, when the glass 30 comprises a relatively low upper liquidus viscosity (e.g., 5 Poise to 5000 Poise). During step 110, the molten glass 30a may be flowed from the melting apparatus 15 at a temperature of 1000° C. or greater, for example, at a temperature from 1000° C. to 1500° C., such as from 1000° C. to 1400° C., from 1000° C. to 1300° C., from 1000° C. to 1250° C., from 1000° C. to 1200° C., from 1000° C. to 1150° C., for example, 1000° C., 1050° C., 1100° C., 1150° C., 1200° C., 1300° C., 1400° C., 1500° C., or any range having any two of these values as endpoints, or any open-ended range having any of these values as a lower or upper bound. Further, the molten glass 30a may comprise a viscosity of from 10 Poise to 100,000 Poise as it flows from the melting apparatus 15, such as from 10 Poise to 50,000 Poise, for example, $5 \times 10^4$ Poise or less, $1 \times 10^4$ Poise or less, $5 \times 10^3$ Poise or less, $1 \times 10^3$ Poise or less, $5 \times 10^2$ Poise or less, 100 Poise or less, 50 Poise or less, 40 Poise or less, 30 Poise or less, 20 Poise or less, 10 Poise or less, or any range having any two of these values as endpoints.

Next, step 120 includes cooling the molten glass 30a in the caster 20 into the cast glass 30b. Without intending to be limited by theory, cooling the molten glass 30a into the cast glass 30b minimizes the formation of crystals in the cast glass 30b and the resultant glass ribbon 30c. The caster 20 cools the molten glass 30a into the cast glass 30b having a viscosity of $10^8$ Poise or more, for example, $5 \times 10^8$ Poise or more, $10^9$ Poise or more, $5 \times 10^9$ Poise or more, $10^{10}$ Poise or more, $5 \times 10^{10}$ Poise, or any range having any two of these values as endpoints. In addition, the caster cools the molten glass 30a into the cast glass 30b having a temperature of no lower than 50° C., for example, no lower than 100° C., no lower than 150° C., no lower than 200° C., no lower than 250° C., no lower than 300° C., no lower than 350° C., no lower than 400° C., no lower than 450° C., no lower than 500° C., and all temperature values between these minimum threshold levels, such as a range from 800° C. to 50° C., 700° C. to 50° C., a range from 650° C. to 750° C., or any range having any two of these values as endpoints or any open-ended range having any of these values as a lower bound. The cooling step 120 is conducted in a fashion to ensure that the cast glass 30b does not fall below 50° C., to ensure that the method 100 can remain continuous in view of the additional heating that occurs during the subsequent conveying step 130, heating step 140, and drawing step 150, respectively. Further, the caster 20 cools the molten glass 30a into the cast glass 30b having a temperature at or above a critical cooling rate for the cast glass 30b (and no lower than 50° C.).

When cooling the cast glass 30b in the caster 20, the maximum growth rate of any crystalline phase is 10 μm/min or less from the upper liquidus viscosity to the lower liquidus viscosity of the glass 30 (also referred to herein as the "devitrification zone"), for example, 9 μm/min or less, 8 μm/min or less, 7 μm/min or less, 6 μm/min or less, 5 μm/min or less, 4 μm/min or less, 3 μm/min or less, 2 μm/min or less, 1 μm/min or less, 0.5 μm/min or less, 0.1 μm/min or less, 0.01 μm/min or less, for example, from 0.01 μm/min to 10 μm/min, from 0.01 μm/min to 5 μm/min, from 0.01 μm/min to 2 μm/min, from 0.01 μm/min to 1 μm/min, from 0.1 μm/min to 1 μm/min, from 0.01 μm/min to 0.5 μm/min, or any range having any two of these values as endpoints, or any open-ended range having any of these values as an upper bound. Notably, the maximum crystal growth rate (Vmax) for the Glass A and Glass B compositions is 6-7 μm/min at 1030° C. and 2-3 μm/min at 1050° C., respectively. Accordingly, when the glass 30 comprise the Glass A or Glass B, during the cooling step 120 the crystal growth rate of glass 30 may be less than these maximum crystal growth rate (Vmax) value of Glass A or Glass B, respectively.

Referring still to FIGS. 1-6B, during the conveying step 130, the cast glass 30b is conveyed from the caster 20 using the one or more tractors 62. In operation, the cast glass 30b can be moved or otherwise conveyed during step 130 by the plurality of tractors 62 from the end of the caster 20 toward the gyrotron microwave heating device 50 and the one or more edge rollers 60. In operation, the tractors 62 may control the velocity of the cast glass 30*b* such that the flow rate of the cast glass 30*b* varies by 1% or less. In some embodiments, when conveyed from the caster 20, the cast glass 30*b* comprises a thickness ($T_{cg}$) of 5 mm or greater, for example, 8 mm or greater, 10 mm or greater, 12 mm or greater, 15 mm or greater, 20 mm or greater, 25 mm or greater, or the like, such as 5 mm to 30 mm, 5 mm to 25 mm, 5 mm to 20 mm, or any range having any two of these values as endpoints, or any open-ended range having any of these values as a lower bound.

Referring still to FIGS. 1-5, the heating step 140 comprises volumetrically heating the cast glass 30*b* using the gyrotron microwave heating device 50. FIG. 5 depicts a portion of the cast glass 30*b* undergoing volumetric heating. As depicted in FIG. 5, the cast glass 30*b* comprises the first major surface 36*a*, the second major surface 36*b*, opposite the first major surface 36*a*, a glass body 35 extending from the first major surface 36*a* to the second major surface 36*b*, and the central region 37 disposed in the glass body 35 equidistant from the first major surface 36*a* and the second major surface 36*b*. Because the heating step 140 relies on volumetric heating, the central region 37 of the cast glass 30*b* heats uniformly with or faster than the first major surface 36*a* and the second major surface 36*b* of the cast glass 30*b* and a temperature of the central region 37 of the cast glass 30*b* is equal to or greater than a temperature of the first major surface 36*a* of the cast glass 30*b* and a temperature of the second major surface 36*b* of the cast glass 30*b*.

For example, during volumetric heating, the central region 37 of the cast glass 30*b* reaches a temperature of 670° C. or greater, for example, 680° C. or greater, 690° C. or greater, 700° C. or greater, 710° C. or greater, 720° C. or greater, 730° C. or greater, 740° C. or greater, 750° C. or greater, 760° C. or greater, 770° C. or greater, 780° C. or greater, 790° C. or greater, 800° C. or greater, 810° C. or greater, 820° C. or greater, 830° C. or greater, 840° C. or greater, 850° C. or greater, 860° C. or greater, 870° C. or greater, 880° C. or greater, 890° C. or greater, 900° C. or greater, such as from 670° C. to 900° C., from 700° C. to 900°, from 700° C. to 875° C., from 700° C. to 850° C., from 700° C. to 825° C., from 700° C. to 800° C., from 700° C. to 775° C., or any range having any two of these values as endpoints, or any open-ended range having any of these values as a lower bound. Further, the cast glass 30*b* is heated to an average viscosity of $10^6$ Poise or less using the gyrotron microwave heating device 50, for example, $5\times10^5$ Poise or less, $10^4$ Poise or less, $5\times10^3$ Poise or less, $10^3$ Poise or less, or any range having any two of these values as endpoints.

While not intending to be limited by theory, it may be advantageous to minimize the heating period to minimize and/or prevent crystallization, while heating the cast glass 30*b* to a high enough temperature through the glass body 35 of the cast glass 30*b* to reach a sufficiently low viscosity to facilitate drawing of the cast glass 30*b* into the glass ribbon 30*c*. Because volumetric heating increases the temperature of the cast glass 30*b* at a faster rate than conventional heating techniques, such as infrared heating, volumetric heating, as described herein, minimizes the heating period needed to reach the desired temperatures and viscosities. For example, during volumetric heating, using the gyrotron microwave heating device 50, the temperature of the cast glass 30*b* increases at a heating rate of 5° C./second or greater, for example, 10° C./second or greater, 20° C./second or greater, 30° C./second or greater, 40° C./second or greater, 50° C./second or greater, 60° C./second or greater, 70° C./second or greater, 80° C./second or greater, 90° C./second or greater, 100° C./second or greater, such as 5° C./second or greater to 100° C./second, 10° C./second to 90° C./second, 20° C./second to 80° C./second, 30° C./second to 80° C./second, 40° C./second to 80° C./second, 50° C./second to 80° C./second, or any range having any two of these values as endpoints. Thus, the central region 37 of the cast glass 30*b* may be heated to the above temperatures in a heating period of 0.1 seconds to 30 seconds, such as 0.1 seconds to 20 seconds, 0.1 seconds to 10 seconds, 0.1 seconds to 7.5 seconds, 0.5 seconds to 7.5 seconds, 1 seconds to 7.5 seconds, 1.8 seconds to 1.5 seconds, 1.5 seconds to 5 seconds, 0.5 seconds to 5 seconds, or any range having any two of these values as endpoints, or any open-ended range having any of these values as a lower or upper bound. As one example, a cast glass 30*b* having a thickness of 25 mm may be heated from 670° C. to 820° C. in a heating period of 5 seconds. In the embodiments described herein, the heating rates that occur during volumetric heating using the gyrotron microwave heating device 50 may be determined based on math modeling results, such as those described below with respect to FIG. 8.

Figure 7:
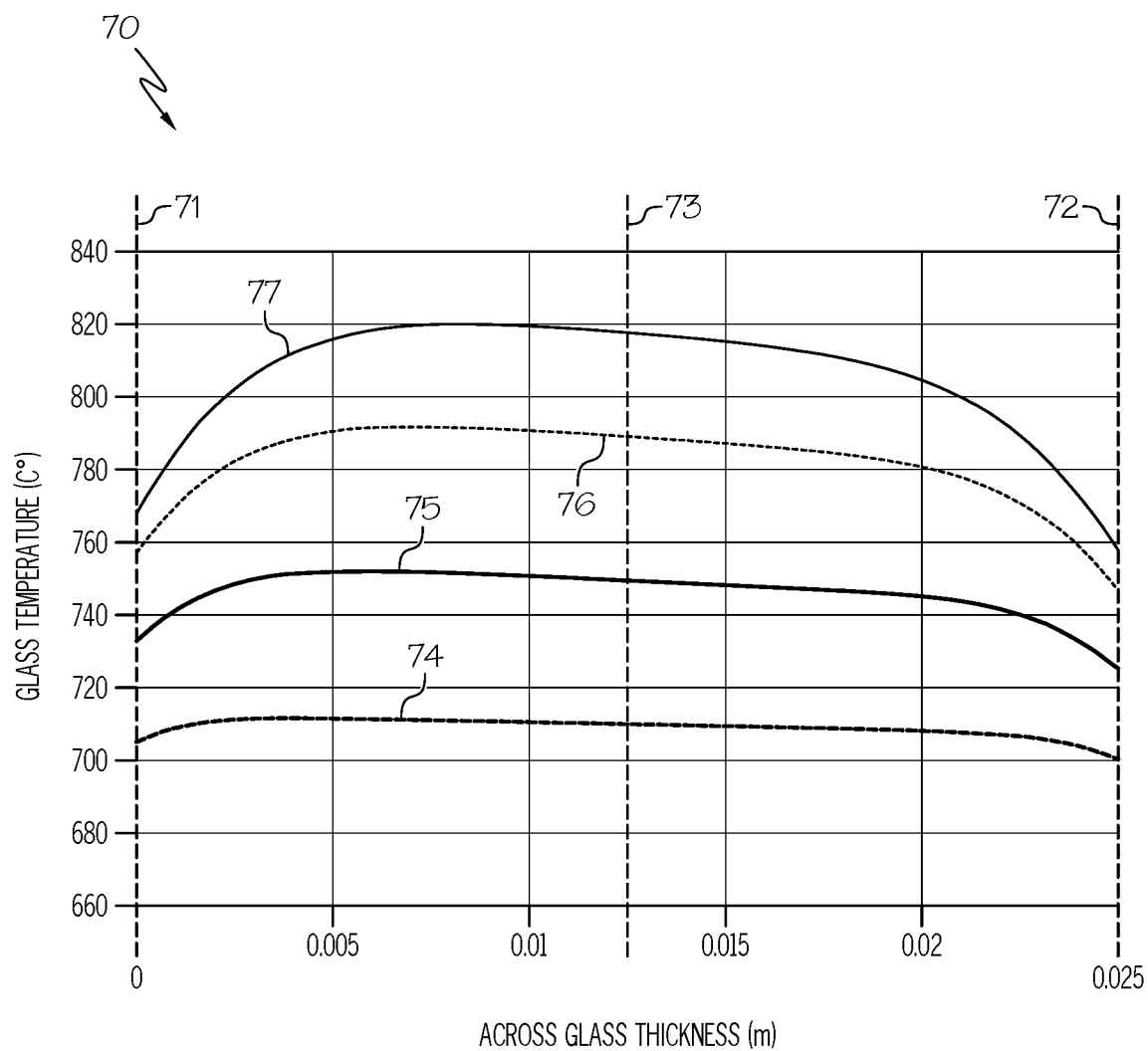
FIG. 7 graphically depicts a temperature profile across the thickness of a cast glass while volumetrically heating the cast glass, according to one or more embodiments shown and described herein FIG. 8 graphically depicts an average temperature of a cast glass while heating the cast glass using different heating sources, according to one or more embodiments shown and described herein.

Referring now to FIG. 7, a graph 70 shows a temperature profile across the thickness of an example cast glass having a thickness of 25 mm volumetrically heated using a single gyrotron microwave heating device 50 after different heating times. While thermocouples may be used to determine the temperature of the glass at the major surfaces and throughout the thickness of the glass (i.e., determine glass volumetric temperature distribution), the temperature profile depicted in FIG. 7 was determined from math modeling results. The first major surface of the example cast glass is noted at position 71, the second major surface is noted at position 72, and the central region is noted at position 73. Further, line 74 shows the temperature profile across the thickness of the example cast glass for a heating period of 10 seconds, line 75 shows the temperature profile across the thickness of the example cast glass for a heating period of 20 seconds, line 76 shows the temperature profile across the thickness of the example cast glass for a heating period of 30 seconds, and line 77 shows the temperature profile across the thickness of the example cast glass for a heating period of 40 seconds. As shown in FIG. 7, the central region (noted at position 73) of the example cast glass has a higher temperature than the temperature of the first major surface (noted at position 71) and the second major surface (noted at position 72) after each of the heating periods shown by lines 74-77. Moreover, FIG. 7 depicts that the difference in temperature between the central region (noted at position 73) and each of the first major surface (noted at position 71) and the second major surface (noted at position 72) increases as the heating period increases.

Figure 8:
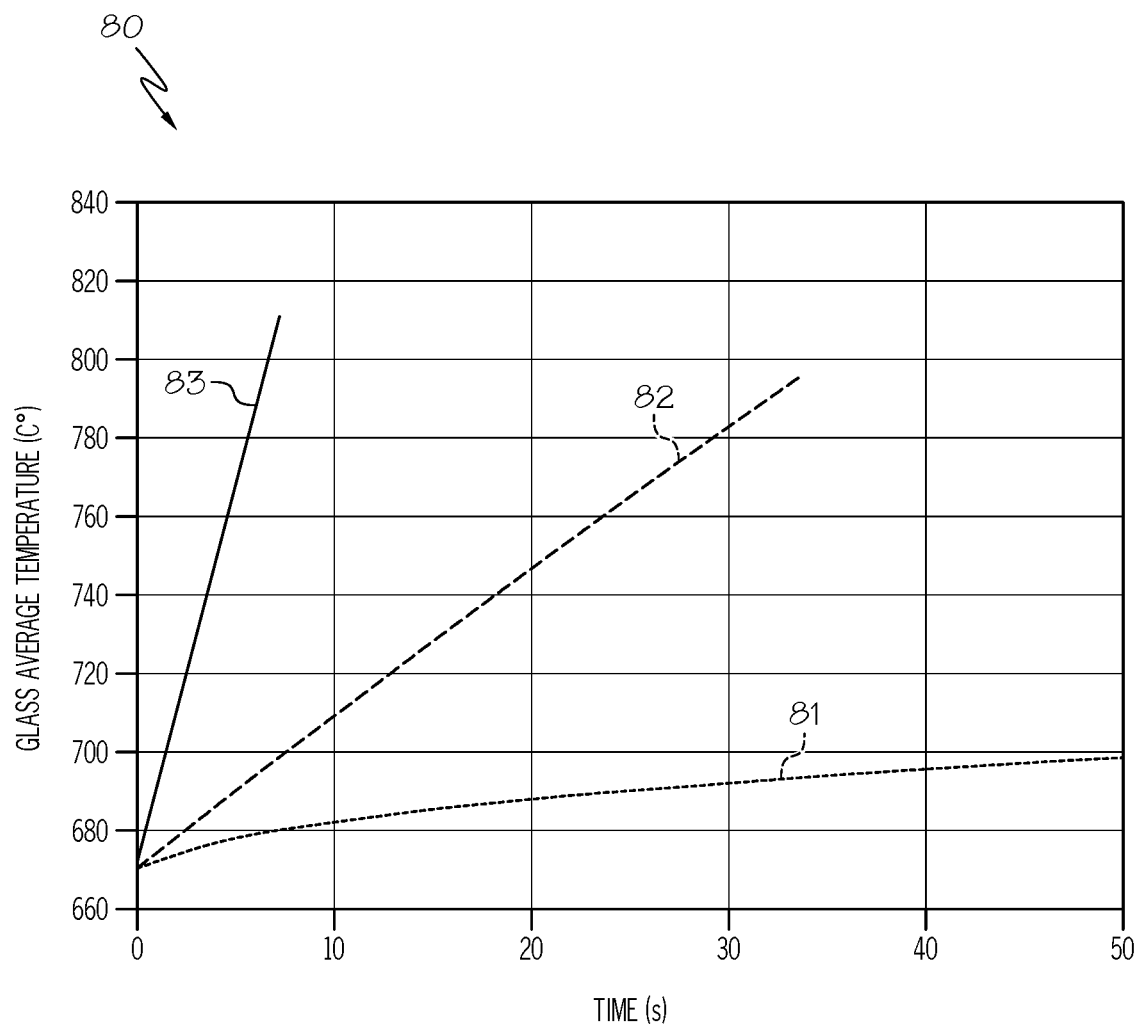

Referring now to FIG. 8, a graph 80 shows the average temperature of an example cast glass having a thickness of 25 mm over time during the heating step 140 using different heating sources. While thermocouples may be used to determine the temperature of the glass at the major surfaces and throughout the thickness of the glass (i.e., determine glass volumetric temperature distribution), the temperature profile depicted in FIG. 7 was determined from math modeling results. For example, line 81 shows the average temperature of an example cast glass over time during the heating step 140 using an infrared heat source having a power intensity of $10^6$ W/m², line 82 shows the average temperature of an example cast glass over time during the heating step 140 using a single gyrotron microwave heating device 50 having a power intensity of $10^6$ W/m², and line 83 shows the average temperature of an example cast glass over time during the heating step 140 using a single gyrotron microwave heating device 50 having a power intensity of $5 \times 10^6$ W/m². As shown in FIG. 8, the gyrotron microwave heating device 50 produces a faster heating rate than an infrared heating source, even when they have the same power intensity. For example, the heating rate for volumetric heating using the gyrotron microwave heating device 50 is seven times greater than the heating rate for infrared heating with the same power intensity.

Figure 9:
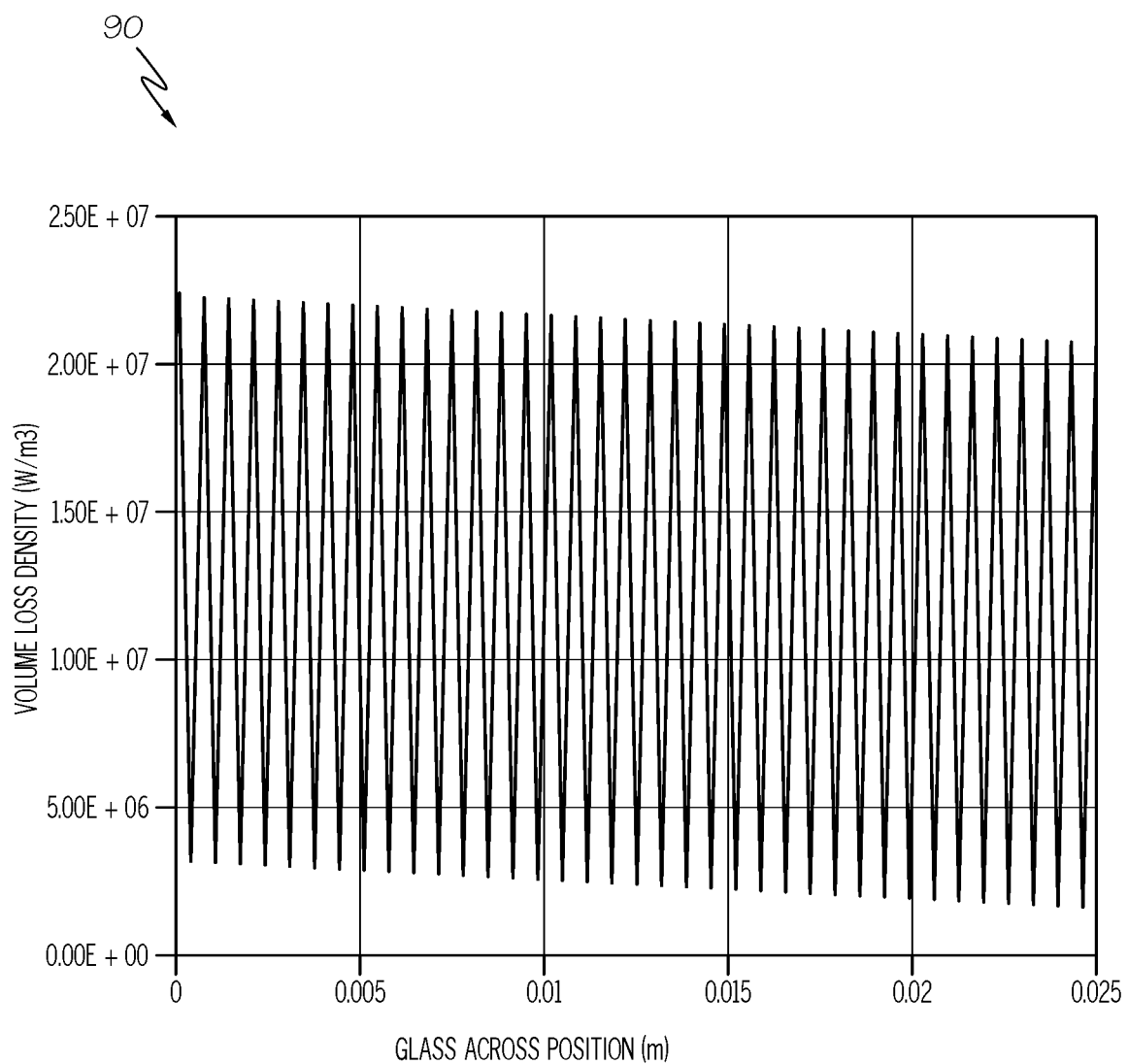
FIG. 9 graphically depicts volume loss density distribution of a cast glass while volumetrically heating the cast glass using a single gyrotron microwave heating device, according to one or more embodiments shown and described herein.
Figure 10:
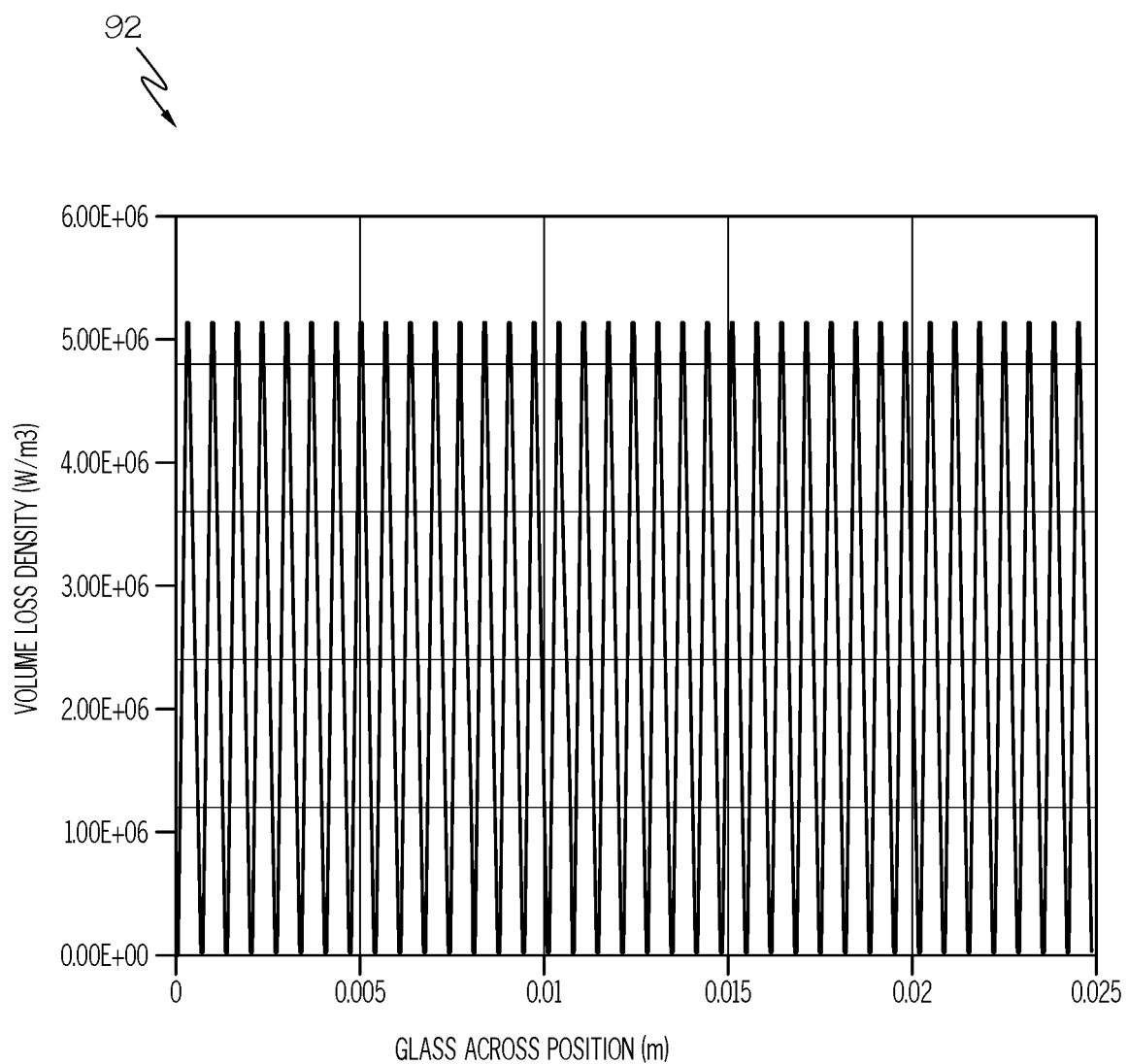
FIG. 10 graphically depicts volume loss density distribution of a cast glass while volumetrically heating the cast glass using two gyrotron microwave heating devices, according to one or more embodiments shown and described herein.

Referring now to FIGS. 9 and 10, a graph 90 (FIG. 9) and a graph 92 (FIG. 10) are depicted, each showing the volume loss density distribution for an example 25 mm thick cast glass being volumetrically heated using a single gyrotron microwave heating device 50 directing a microwave beam 54 at one major surface of the example cast glass (graph 90 of FIG. 9) or two gyrotron microwave heating devices 50 directing microwave beams 54 at each major surface of the example cast glass (graph 92 of FIG. 10). In both graphs 90 and 92, the microwave beam(s) 54 is generated by the gyrotron microwave heating device(s) 50 having a frequency of 60 GHz and a power intensity of $10^6$ W/m². As shown in graphs 90 and 92, volumetric heating using the gyrotron microwave heating device(s) 50 generates sinusoidal volume loss density distribution and as shown in graph 92, volumetrically heating the cast glass from two sides increases the uniformity of the sinusoidal volume loss density distribution. Sinusoidal volume loss density distribution enables continuous energy to be applied across the thickness of the cast glass generating a heating effect inside the cast glass and, without intending to be limited by theory, this sinusoidal pattern creates a uniform temperature profile and it is beneficial during volumetric heating, particularly of thick cast glass.

Referring again to FIGS. 1-6B, the drawing step 150 includes drawing the cast glass 30b into the glass ribbon 30c, for example, while the cast glass 30b is volumetrically heated using the gyrotron microwave heating device 50, after the cast glass 30b is volumetrically heated using the plurality of gyrotron microwave heating devices 50, or both. The cast glass 30b may be drawn into the glass ribbon 30c using the one or more edge rollers 60. In some embodiments, the cast glass 30b is drawn into a glass ribbon 30c having a width 32 ($W_{gr}$) that is less than or equal to the width 22 ($W_{cast}$) of the caster 20 and a thickness ($T_{gr}$) 34 that is less than the thickness ($T_{cast}$) of the caster 20. The method 100 further includes a cooling step 160 of cooling the glass ribbon 30c to ambient temperature. The step 160 of cooling the glass ribbon 30c can be conducted with or without external cooling. In some embodiments, the edge rollers 60 can include a cooling capability for effecting some or all of the cooling within the cooling step 160.

In some embodiments, the width 32 ($W_{gr}$) of the glass ribbon 30c is from 10 mm to 5 mm, from 20 mm to 5 mm, from 30 mm to 5 mm, from 40 mm to 5 mm, from 50 mm to 5 mm, from 100 mm to 5 mm, from 200 mm to 5 mm, from 250 mm to 5 mm, from 300 mm to 5 mm, from 350 mm to 5 mm, from 400 mm to 5 mm, or any range having any two of these values as endpoints, or any open-ended range having any of these values as a lower or upper bound levels. In some embodiments, the thickness 34 ($T_{gr}$) is from 0.1 mm to 2 mm, such as 0.2 mm to 1.5 mm, 0.3 mm to 1 mm, 0.3 to 0.9 mm, 0.3 to 0.8 mm, 0.3 to 0.7 mm, or any range having any two of these values as endpoints, or any open-ended range having any of these values as a lower or upper bound.

Further, the glass ribbon 30c formed using the method 100 has a thickness variation of 200 μm or less, for example, 150 μm or less, 100 μm or less, 75 μm, 50 μm or less, 40 μm or less, 30 μm or less, 20 μm or less, 10 μm or less, 5 μm or less, 4 μm or less, 3 μm or less, 2 μm or less, 1 μm or less, 0.5 μm or less, or the like, such as from 0.01 μm to 50 μm, from 0.01 μm to 25 μm, from 0.01 μm to 10 μm, from 0.01 μm to 5 μm, from 0.01 μm to 1 μm, or any range having any two of these values as endpoints, or any open-ended range having any of these values as an upper bound. Further, the glass ribbon 30c formed using method 100 has a warp of 500 μm or less, for example, 400 μm or less, 300 μm or less, 200 μm or less, 150 μm or less, 100 μm or less, 50 μm or less, 40 μm or less, 30 μm or less, 20 μm or less, 10 μm or less, 5 μm or less, 0.1 μm or less, 0.05 μm or less, or the like, such as from 0.01 μm to 500 μm, from 0.01 μm to 250 μm, from 0.01 μm to 100 μm, from 0.1 μm to 100 μm, from 0.1 μm to 50 μm, from 0.1 μm to 25 μm, from 0.01 μm to 25 μm, or any range having any two of these values as endpoints, or any open-ended range having any of these values as an upper bound. Moreover, the glass ribbon 30c has a surface roughness (Ra) of 5 μm or less (as measured prior to any post-processing), for example, 4 μm or less, 3 μm or less, 2 μm or less, 1 μm or less, 0.75 μm or less, 0.5 μm or less, 0.25 μm or less, 0.1 μm or less, 50 nm or less, as low as 10 nm, or any range having any two of these values as endpoints, or any open-ended range having any of these values as an upper bound.

Referring again to FIG. 3, the glass ribbon 30c can be sectioned into wafers 40 after cooling the glass ribbon 30c. The wafer 40 comprise maximum dimension (e.g., a diameter, width or other maximum dimension) ranging from equivalent to the width 32 ($W_{gr}$) of the glass ribbon 30c to 50% of the width 32 of the glass ribbon 30c. For example, the wafers 40 can have a thickness of 2 mm or less and a maximum dimension of 100 mm to 500 mm. In some embodiments, the wafers 40 have a thickness of 1 mm or less and a maximum dimension of 150 mm to 300 mm. The wafers 40 can also have a thickness that ranges from 1 mm to 50 mm, or 1 mm to 25 mm. The wafers 40 can also have a maximum dimension that ranges from 25 mm to 300 mm, from 50 mm to 250 mm, from 50 mm to 200 mm, or 100 mm to 200 mm. The wafers 40 formed according to the method 100, without any additional surface polishing, can exhibit the same thickness variation levels, surface roughness and/or warp levels outlined earlier in connection with the glass ribbon 30c. In some embodiments, the wafers 40 can be subjected to grinding and polishing to obtain the final dimensions of the end product, e.g., display glass for augmented reality applications. The wafers 40 are depicted in FIG. 3 as discs, however, it should be understood that the wafers 40 may comprise any of a variety of shapes including, but not limited to, squares, rectangles, circles, ellipsoids and others.

In view of the foregoing description, it should be understood that the continuous cast and draw method described herein may be used to form glass ribbon from low viscosity glass compositions, such as those useful as augmented reality displays. The continuous cast and draw method described herein includes flowing a molten glass into a caster to form a cast glass, cooling the cast glass in the caster, conveying the cast glass from the caster, and heating and drawing the cast glass into a thin glass ribbon. In particular, the methods herein use a gyrotron microwave heating device to volumetrically heat cast glass at a fast rate after the cast glass exits the caster and prior to drawing it into a thin glass ribbon to minimize defect formation in the glass. The continuous cast and draw method described herein enables mass production of the optical components made from low viscosity glass, such as display glass for augmented reality application having minimal defects at a reduced cost when compared to previous glass forming methods.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of forming a glass ribbon, the method comprising:
    flowing a molten glass into a caster having a width ($W_{cast}$) and a thickness ($T_{cast}$) to form a cast glass;
    cooling the cast glass in the caster to a viscosity of $10^8$ Poise or more;
    conveying the cast glass from the caster;
    volumetrically heating the cast glass to an average viscosity of $10^6$ Poise or less using a gyrotron microwave heating device; and
    drawing the cast glass into a glass ribbon having a width ($W_{gr}$) that is less than or equal to the width ($W_{cast}$) of the caster and a thickness ($T_{gr}$) that is less than the thickness ($T_{cast}$) of the caster.

2. The method of claim 1, wherein, during volumetric heating, the temperature of the cast glass increases at a heating rate of 15° C./second or greater.

3. The method of claim 1, wherein volumetrically heating the cast glass occurs for a heating period of 0.5 seconds to 10 seconds.

4. The method of claim 1, wherein, during volumetric heating, the gyrotron microwave heating device generates a microwave beam comprising a power intensity of $1 \times 10^6$ W/m² or greater.

5. The method of claim 1, wherein, during volumetric heating, the gyrotron microwave heating device generates a microwave beam comprising a frequency of 10 GHz to 300 GHz.

6. The method of claim 1, wherein:
    the cast glass comprises a first major surface, a second major surface opposite the first major surface, and a glass body extending from the first major surface to the second major surface and comprising a central region disposed equidistant from the first major surface and the second major surface; and
    during volumetric heating of the cast glass, a temperature of the central region of the glass body of the cast glass is equal to or greater than a temperature of the first major surface of the cast glass and a temperature of the second major surface of the cast glass.

7. The method of claim 6, wherein, during volumetric heating, the central region of the cast glass reaches a temperature of 750° C. or greater.

8. The method of claim 1, wherein during volumetric heating, the gyrotron microwave heating device generates a microwave beam and a cross section of the microwave beam comprises a width that is greater than the width ($W_{cast}$) of the caster.

9. The method of claim 1, wherein the width ($W_{cast}$) of the caster is from 100 mm to 1 m and the thickness ($T_{cast}$) of the caster is from 10 mm to 50 mm.

10. The method of claim 1, wherein, when conveyed from the caster, the cast glass comprises a thickness ($T_{cg}$) of 12 mm or greater.

11. The method of claim 1, wherein the cast glass is cooled in the caster to a temperature of 700° C. or less and no lower than 50° C.

12. The method of claim 1, wherein a maximum crystal growth rate of any crystalline phase of the cast glass is from 0.01 μm/min to 10 μm/min.

13. The method of claim 1, wherein the molten glass flowing into the caster comprises a borosilicate glass, an aluminoborosilicate glass, an aluminosilicate glass, a fluorosilicate glass, a phosphosilicate glass, a fluorophosphate glass, a sulfophosphate glass, a germanate glass, a vanadate glass, a borate glass, or a phosphate glass.

14. The method of claim 1, wherein the molten glass flowing into the caster comprises a viscosity of $5 \times 10^4$ Poise or less and a temperature of 1000° C. or greater.

15. The method of claim 1, wherein:
    the thickness ($T_{gr}$) of the glass ribbon is from 0.3 mm to 1 mm;
    the glass ribbon comprises a refractive index of from 1.6 to 1.9; and the glass ribbon comprises a thickness variation from 0.01 µm to 50 µm and a warp from 0.01 µm to 100 µm.

\* \* \* \* \*